(12) United States Patent
Old

(10) Patent No.: US 8,843,541 B1
(45) Date of Patent: Sep. 23, 2014

(54) CIRCUIT AND METHOD FOR MULTIPLYING A SIGNED VALUE BY A CONSTANT

(75) Inventor: Gordon I. Old, Balerno (GB)

(73) Assignee: Xilinx, Inc., San Jose, CA (US)

( * ) Notice: Subject to any disclaimer, the term of this patent is extended or adjusted under 35 U.S.C. 154(b) by 601 days.

(21) Appl. No.: 13/170,032

(22) Filed: Jun. 27, 2011

(51) Int. Cl.
*G06F 7/38* (2006.01)

(52) U.S. Cl.
USPC .......................................... 708/523; 708/490

(58) Field of Classification Search
None
See application file for complete search history.

(56) References Cited

U.S. PATENT DOCUMENTS

| | | | | |
|---|---|---|---|---|
| 5,025,408 A | * | 6/1991 | Sherman | 708/627 |
| 5,408,426 A | * | 4/1995 | Takewa et al. | 708/497 |
| 5,446,651 A | * | 8/1995 | Moyse et al. | 708/630 |

* cited by examiner

*Primary Examiner* — Michael D Yaary
(74) *Attorney, Agent, or Firm* — LeRoy D. Maunu

(57) ABSTRACT

A multiplier circuit and method multiply a signed value by a constant. The signed value received at an input port is separable into two or more splices. A first splice is a most significant one of the splices, and a second splice is another one of the splices. One or more memories provide respective partial products for the splices, and these memories include a shared memory. The shared memory provides the respective partial products for the first and second splices from storage locations in the shared memory. The storage locations that are readable to provide the respective partial product for the second splice are a subset of the storage locations that are readable to provide the respective partial product for the first splice. An addition circuit sums the respective partial products for the splices.

20 Claims, 3 Drawing Sheets

US 8,843,541 B1

CIRCUIT AND METHOD FOR MULTIPLYING A SIGNED VALUE BY A CONSTANT

FIELD OF THE INVENTION

One or more embodiments generally relate to multiplication circuits, and more particularly to circuits for multiplying a signed value by a constant.

BACKGROUND

Digital circuits perform logic and arithmetic functions, such as multiplying two numbers. The digital circuits for multiplying two numbers are simpler when one of the numbers has a constant value. The digital circuits for multiplying two numbers become more complex when the digital circuit must multiply signed numbers. There is a general need to provide multiplication circuits that are simple and can multiply signed values.

SUMMARY

In one embodiment, a multiplier circuit multiplies a signed value by a constant. The signed value received at an input port is separable into two or more splices. A first splice is a most significant one of the splices, and a second splice is another one of the splices. One or more memories provide respective partial products for the splices, and these memories include a shared memory. The shared memory provides the respective partial products for the first and second splices from storage locations in the shared memory. The storage locations that are readable to provide the respective partial product for the second splice are a subset of the storage locations that are readable to provide the respective partial product for the first splice. An addition circuit sums the respective partial products for the splices.

In one embodiment, a method multiplies a signed value by a constant. The signed value is separated into two or more splices that include a first and a second splice. The first splice is a most significant one of the splices. Respective partial products for the splices are read from one or more memories, including reading the respective partial products for the first and second splices from a shared memory. The shared memory includes multiple storage locations. The storage locations that are readable by the second splice are a subset of the storage locations that are readable by the first splice. The respective partial products for the at least two splices are summed.

It will be appreciated that various other embodiments are set forth in the Detailed Description and Claims which follow.

BRIEF DESCRIPTION OF THE DRAWINGS

Various aspects and advantages of the disclosed embodiments will become apparent upon review of the following detailed description and upon reference to the drawings, in which.

DETAILED DESCRIPTION

Figure 1:
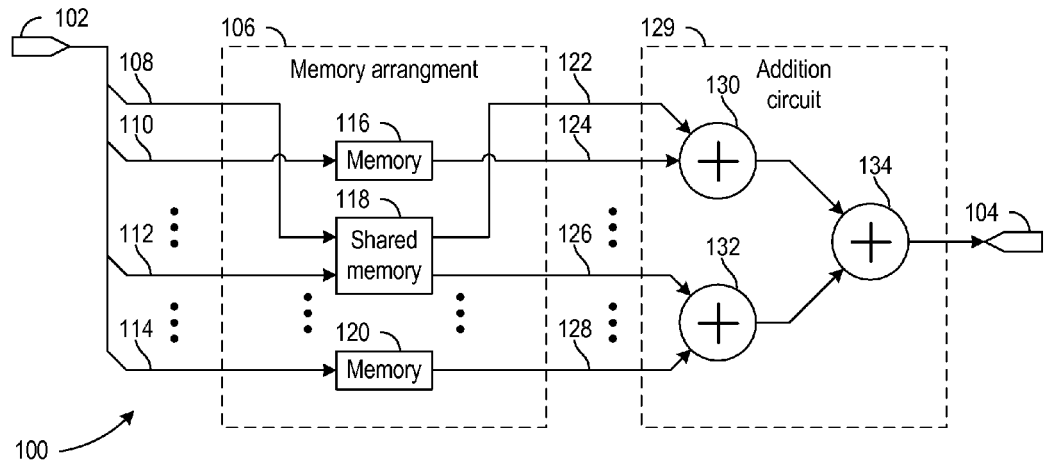
FIG. 1 is a block diagram of a circuit for multiplying a signed value by a constant.

FIG. 1 is a block diagram of a circuit 100 for multiplying a signed value by a constant. The signed value is received at input port 102 and the multiplication product is produced at output port 104. The product produced at output port 104 multiplies the signed value received at input port 102 by a constant specified by the particular values stored in memory arrangement 106.

The signed value received at input port 102 separates into the splices on lines 108, 110, 112, and 114. It will be appreciated that the number of splices may be two splices, three splices, or more than the four splices shown in FIG. 1, and the splices need not have equal bit widths. Increasing the number of splices reduces the number of storage locations required in memory arrangement 106, but increasing the number of splices increases the number of adders 130, 132, and 134 that addition circuit 129 needs to produce the multiplication product at output port 104.

The splice on line 108 is a most significant one of the splices on lines 108, 110, 112, and 114, such that the splice on line 108 includes the most significant bits of the signed value. A sign bit is a most significant bit of the signed value, and the most significant bit of splice on line 108 is the sign bit of the signed value. In one embodiment, a two's complement representation specifies the signed value, and the sign bit is the most significant bit of the two's complement representation.

Memory arrangement 106 includes memories 116, 118, and 120 coupled to the input port 102 to receive the splices on lines 108, 110, 112, and 114. The memory arrangement 106 generates partial products on lines 122, 124, 126, and 128 for the splices on lines 108, 110, 112, and 114, respectively. Each memory 116, 118, or 120 in memory arrangement 106 receives one or more of the splices on lines 108, 110, 112, and 114 and produces a corresponding one or more of the partial products on lines 122, 124, 126, and 128.

Memory 118 is a shared memory that receives the most significant splice on line 108 and another splice on line 112 in the embodiment illustrated in FIG. 1; however, shared memory 118 could receive the most significant splice on line 108 and any of the other splices on lines 110, 112, and 114. Shared memory 118 generates the respective partial products on lines 122 and 126 for the splices on lines 108 and 112. Memory 118 is a shared memory because memory 118 stores the possible values of the partial products on lines 122 and 126 in overlapping storage locations within memory 118.

In the embodiment illustrated in FIG. 1, separate single-port memories 116 and 120 generate the partial products on lines 124 and 128 for the remaining splices on lines 110 and 114. In another embodiment, shared memory 118 additionally generates some or all of the partial products on lines 124 and 128 for the remaining splices on lines 110 and 114. In one example, shared memory 118 is a multiport memory having a respective port coupled to each of the splices on lines 108, 110, 112, and 114. In another example, shared memory 118 is memory with one port coupled to each of the splices on lines 108, 110, 112, and 114 during different clock cycles that can be successive or spaced clock cycles in any order. An additional embodiment replaces memories 116 and 120 with a shared memory that generates the partial products on lines 124 and 128 for the splices on lines 110 and 114.

The contents of memories 116, 118, and 120 are initialized with values for the partial products on lines 122, 124, 126, and 128. For example, when the circuit 100 multiplies the signed value received at input port 102 by the constant of three, then each storage location in each memory 116, 118, or 120 is initialized to the product of three times the value of the splice on line 108, 110, 112, or 114 that addresses that storage location in the memory. Thus, the partial products on lines 122, 124, 126, and 128 read from the addressed storage locations are the constant times the respective splices on lines 108, 110, 112, or 114.

Because the most significant splice on line 108 includes the sign bit of the signed value, shared memory 118 is initialized with the constant times the positive and negative values of the splice on line 108. In contrast, because the splices on lines 110 and 114 do not include a sign bit and may be considered unsigned, memories 116 and 120 are initialized with the constant times the solely positive values of the splices on lines 110 and 114.

Shared memory 118 correspondingly stores the constant times the positive and negative values of the splice on line 108, and the constant times the solely positive values of the splice on line 112. Because the constant times the possible negative values of the splice on line 108 do not provide a valid partial product on line 126 for the splice on line 112, the splice on line 112 cannot properly address the storage locations in shared memory 118 that store the constant times these negative values. Thus, shared memory 118 cannot have fully overlapping storage locations for the partial products for both the splice on line 108 and the splice on line 112. However, the splice on line 112 can properly address storage locations that store the partial products for the most significant splice on line 108 when these storage locations are limited to those that store partial products for the constant times the positive values of the splice on line 108.

Half of the storage locations in shared memory 118 store partial products for the constant times the positive values of the splice on line 108, and the other half of the storage locations in shared memory 118 store partial products for the constant times the negative values of the splice on line 108. Because of this, the splice on line 112 can properly address the one-half of the storage locations in shared memory 118 that store partial products for the constant times the positive values of the splice on line 108. This increases circuit utilization efficiency of the multiplication circuit 100 because shared memory 118 is shared to generate the partial products on lines 122 and 126 for multiple splices on lines 108 and 112.

Addition circuit 129 sums the partial products on lines 122, 124, 126, and 128 from memory arrangement 106. In one embodiment, addition circuit 129 includes a summing tree of adders 130, 132, and 134. Adder 130 sums the partial products on lines 122 and 124 for the splices on lines 108 and 110, and adder 132 sums the partial products on lines 126 and 128 for the splices on lines 112 and 114. Adder 134 sums the results from adders 130 and 132 to generate the final product that multiplies the signed value at input port 102 and a constant determined by the contents of memories 116, 118, and 120.

In another embodiment, the shared memory 118 is a single-port memory arranged to implement a shared memory using time multiplexing. The splices on lines 108 and 112 are coupled to the address bus of the single port of the time-multiplexed shared memory 118 on different clock cycles. The respective partial products for the splices on lines 108 and 112 are serially read from corresponding storage locations in the time-multiplexed shared memory 118. The respective partial products on lines 122 and 126 are added serially in the addition circuit 129 that includes a shift-accumulator. Alternatively, the corresponding partial products on lines 122 and 126 are stored until all partial products are available, and then the partial products on lines 122, 124, 126 and 128 are added in parallel as depicted in FIG. 1. It will be appreciated that combinations of the parallel and serial embodiments are also viable.

Figure 2:
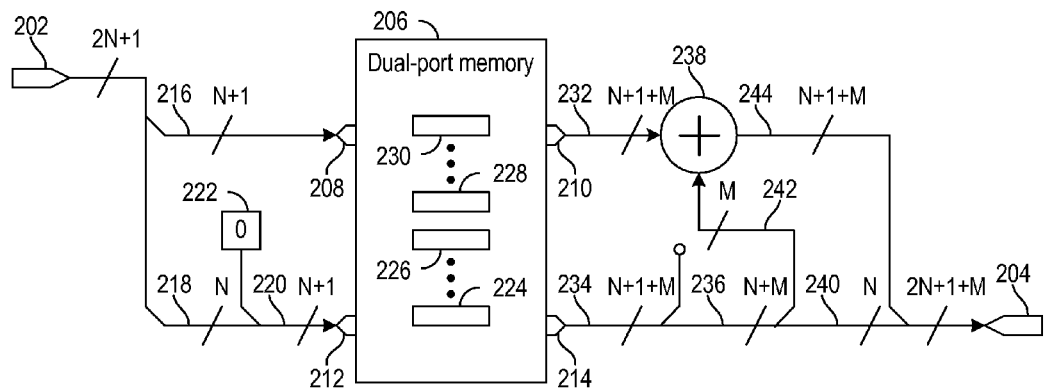
FIG. 2 is a block diagram of an example circuit for multiplying a signed value by a constant using a dual-port memory.

FIG. 2 is a block diagram of an example circuit for multiplying a signed value by a constant using a dual-port memory 206. A signed value is received at input port 202 and the multiplication product is produced at output port 204. In one embodiment, the input port 202 receives the signed value in a two's complement representation having a sign bit as the most significant bit of the two's complement representation. In the example of FIG. 2, an odd number of bits 2N+1 represents the signed value received at input port 202, and M bits represent the multiplicative constant. Thus, 2N+1+M bits are needed to represent the multiplication product produced at output port 204.

The dual-port memory 206 has two ports supporting concurrent reads. One port inputs an address bus 208 with N+1 address bits and outputs a data bus 210 with N+1+M data bits, and the other port inputs an address bus 212 with N+1 address bits and outputs a data bus 214 with N+1+M data bits.

An interconnect arrangement couples the input port 202 to the dual-port memory 206. The interconnect arrangement separates the bits representing the signed value at the input port 202 into respective contiguous groups for the splices on lines 216 and 218. One contiguous group includes the most significant N+1 bits assigned to splice on line 216, and the other contiguous group includes the least significant N bits assigned to the splice on line 218. The interconnect arrangement assigns the sign bit to the most significant splice on line 216, and the interconnect arrangement assigns more bits to the most significant splice on line 216 than the interconnect arrangement assigns to the splice on line 218. Thus, the bits of the most significant splice on line 216 generally number more that the bits of the splice on line 218. FIG. 2 shows the interconnect arrangement assigning one more bit to the splice on line 216 than the interconnect arrangement assigns to the splice on line 218.

The N+1 bits of the most significant splice on line 216 are coupled to the N+1 address bits of the address bus 208. A concatenation on line 220 of a padding bit 222 and the N bits of the least significant splice on line 218 are coupled to the N+1 address bits of the address bus 212. The concatenation on line 220 appends the splice on line 218 after the zero-valued padding bit 222, which becomes the most significant bit of the concatenation on line 220. Thus, the single padding bit 222 in the concatenation on line 220 corresponds to the sign bit of the splice on line 216. It will be appreciated that there might be more than one padding bit 222.

The respective partial product on line 232 for the most significant splice on line 216 is read from one of the storage locations 224 through 226 or 228 through 230, and the respective partial product on line 232 output from the data bus 210. This partial product on line 232 is read from a storage location referenced when the most significant splice on line 216 is applied to the address bus 208. The respective partial product on line 234 for the least significant splice on line 218 is concurrently read from one of the storage locations 224 through 226 referenced by the concatenation on the address bus 212, and this partial product on line 234 is output from data bus 214.

Because the most significant bit of address bus 212 has a value of zero from padding bit 222, address bus 212 references only the storage locations 224 through 226 in the lower half of the dual-port memory 206. Thus, the storage locations 224 through 226 that are readable to provide the partial product on line 234 are a subset of the storage locations 224 through 226 and 228 through 230 that are readable to provide partial product on line 232.

In one embodiment, the storage locations 224 through 226 store the multiplication products of the constant and the possible positive values of the most significant splice on line 216, and the storage locations 228 through 230 store the multiplication products of the constant and the possible negative values of the most significant splice on line 216. Thus, the subset readable to provide the partial product on line 234 is limited to the storage locations 224 through 226 that store partial products for the constant times the possible positive values of the splice on line 216. Therefore, the storage locations 224 through 226 are reused to concurrently provide both partial products on lines 232 and 234 for certain values of splices on lines 216 and 218. Less circuitry is required to implement the multiplication circuit because of this reuse of storage locations 224 through 226. It will be appreciated that diminished reuse occurs with more than one padding bit 222.

Because the most significant bit of the concatenation on line 220 has a value of zero from padding bit 222, the most significant bit of the partial product on line 234 has a constant value that is unneeded to represent the partial product on line 234. Therefore, a portion on line 236 from the data bus 214 couples the partial product on line 234 to the addition circuit 238, and the portion on line 236 includes all of the data bus 214 other than its most significant signal. In addition, the data bus 210 couples the partial product on line 232 for the splice on line 216 to the addition circuit 238.

The addition circuit 238 adds the partial product on line 232 and the portion on line 236 of the partial product on line 234 to produce the multiplication product output at port 204. However, to add the partial product on line 232 and the portion on line 236, addition circuit 238 inputs the partial product on line 232 and the part on line 242 of the portion on line 236, and the part on line 240 bypasses addition circuit 238 as discussed below. Generally, the addition circuit 238 shifts and adds partial products. Each partial product on line 232 and 234 has a weight from the corresponding splice on lines 216 and 218, respectively. The weight of the splice on line 216 and its corresponding partial product on line 232 is $2^N$ because the splice on line 218 has N bits, and the weight of the splice on line 218 and its corresponding partial product on line 234 is one. Thus, the part on line 240, which includes the least significant N bits of the portion on line 236, bypasses the addition circuit 238 and becomes the least significant N bits of the multiplication product provided at output port 204. Addition circuit 238 adds the remaining part on line 242, which includes the most significant M bits of the portion on line 236, and the N+1+M bits of the partial product on line 232 to produce the most significant N+1+M bits on line 244 of the product provided at output port 204. In summary, addition circuit 238 shifts the partial product on line 232 by N bits and adds the result to the portion on line 236 of the partial product on line 234.

It will be appreciated that when the multiplicative constant is the most negative number in a two's complement representation, the addition circuit 238 might not always be able to correctly represent its output on line 244 in the N+1+M bits shown. To handle this case properly, another bit can be added to each of the outputs on line 244 of the addition circuit 238 and the final product produced at output port 204.

Figure 3:
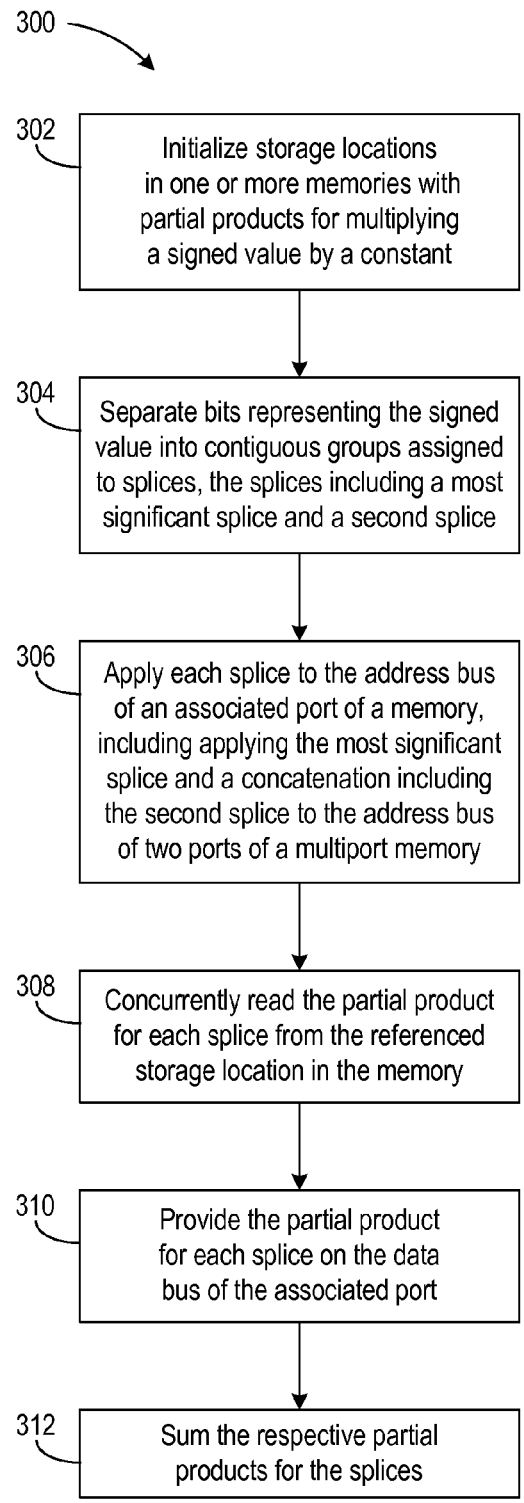
FIG. 3 is a flow diagram of a process for multiplying a signed value by a constant.

FIG. 3 is a flow diagram of a process 300 for multiplying a signed value by a constant. Partial products are read from one or more memories including a multiport memory, and these partial products are added to produce the multiplicative result. The initialized values in the memories specify the constant multiplier. In one embodiment, bits represent the signed value in a two's complement representation, having a sign bit as a most significant bit of the signed value.

At block 302, the storage locations in a multiport memory are initialized with the partial products for the potential signed values of the most significant splice. The partial product for each potential signed value is the signed product from multiplying the potential signed value times the constant. Any remaining memories are also initialized with partial produces from multiplying the constant and the potential positive values of the corresponding spice. The memories are read-only memories (ROM) initialized during manufacture in one embodiment, and random access memories (RAM) initialized to static values in another embodiment.

At block 304, the bits representing the signed value are separated into respective contiguous groups for two or more splices. The respective contiguous group for the most significant splice includes the most significant bits of the signed value. The bits in the respective contiguous group for the most significant splice number at least one more than the bits in the respective contiguous group for a second splice. Assigned to each splice are the bits in the respective contiguous group for the splice. Thus, the most significant bits of the signed value are assigned to the most significant splice, including assigning the sign bit of the signed value to the most significant splice.

At block 306, each splice is applied to the address bus of an associated port of the one or more memories. The most significant splice is applied to the address bus of a first port of a multiport memory, and a concatenation of one or more padding bits and the second splice is applied to the address bus of a second port of the multiport memory. The concatenation appends the second splice after one or more zero-valued padding bits. In one embodiment, the concatenation appends the second splice after a single zero-valued padding bit that corresponds to the sign bit of the first splice.

At block 308, the respective partial product for each splice is read from the referenced storage location in the one or more memories. The respective partial products for the most significant and second splices are read from a multiport memory containing multiple storage locations. The storage locations that are readable by the second splice are a subset of the storage locations that are readable by the most significant splice. In one embodiment, the subset is the lower half of the storage locations that are readable by the most significant splice.

In one embodiment, the respective partial products for the most significant and second splices are concurrently read from the multiport memory. The respective partial product for the most significant splice is read from one of the storage locations referenced by the most significant splice applied to the address bus of the first port of the multiport memory, and the respective partial product for the second splice is concurrently read from one of the storage locations referenced by the concatenation applied to the address bus of the second port of the multiport memory.

At block 310, the respective partial product for each splice are provided on the data bus of the associated port of the one or more memories. In one embodiment, the respective partial product for the most significant splice is provided from the data bus of the first port of the multiport memory, and the respective partial product for the second splice is provided in a portion of the data bus of the second port of the multiport memory.

At block 312, the respective partial products for the splices are summed to yield the multiplication product of the signed value and the constant.

Figure 4:
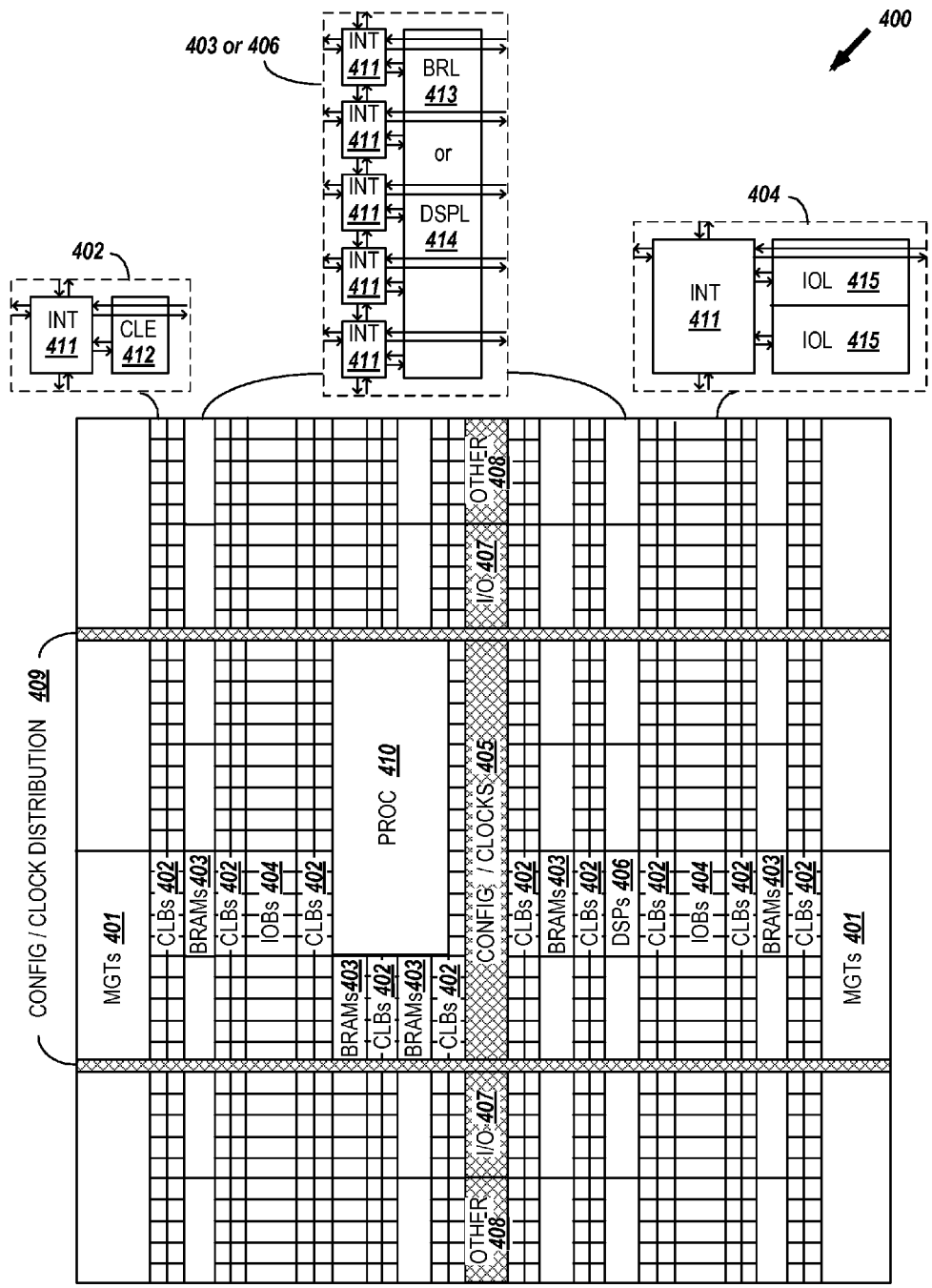
FIG. 4 is a block diagram of an example programmable integrated circuit configurable to multiply a signed value by a constant.

FIG. 4 is a block diagram of an example programmable integrated circuit configurable to multiply a signed value by a constant. The illustrated programmable integrated circuit is referred to as a Field Programmable Gate Array (FPGA). FPGAs can include several different types of programmable logic blocks in the array. For example, FIG. 4 illustrates an FPGA architecture (400) that includes a large number of different programmable tiles including multi-gigabit transceivers (MGTs) 401, configurable logic blocks (CLBs) 402, random access memory blocks (BRAMs) 403, input/output blocks (IOBs) 404, configuration and clocking logic (CONFIG/CLOCKS) 405, digital signal processing blocks (DSPs) 406, specialized input/output blocks (I/O) 407, for example, e.g., clock ports, and other programmable logic 408 such as digital clock managers, analog-to-digital converters, system monitoring logic, and so forth. Some FPGAs also include dedicated processor blocks (PROC) 410 and internal and external reconfiguration ports (not shown).

In some FPGAs, each programmable tile includes a programmable interconnect element (INT) 411 having standardized connections to and from a corresponding interconnect element in each adjacent tile. Therefore, the programmable interconnect elements taken together implement the programmable interconnect structure for the illustrated FPGA. The INT 411 also includes the connections to and from the programmable logic element within the same tile, as shown by the examples included at the top of FIG. 4.

For example, a CLB 402 can include a configurable logic element (CLE) 412 that can be programmed to implement user logic plus a single INT 411. A BRAM 403 can include a BRAM logic element (BRL) 413 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 406 can include a DSP logic element (DSPL) 414 in addition to an appropriate number of programmable interconnect elements. An IOB 404 can include, for example, two instances of an input/output logic element (IOL) 415, in addition to one instance of the INT 411. As will be clear to those of skill in the art, the actual I/O pads connected, for example, to the IOL 415 are manufactured using metal layered above the various illustrated logic blocks, and typically are not confined to the area of the IOL 415.

In the pictured embodiment, a columnar area near the center of the die (shown shaded in FIG. 4) is used for configuration, clock, and other control logic. Horizontal areas 409 extending from this column are used to distribute the clocks and configuration signals across the breadth of the FPGA.

Some FPGAs utilizing the architecture illustrated in FIG. 4 include additional logic blocks that disrupt the regular columnar structure making up a large part of the FPGA. The additional logic blocks can be programmable blocks and/or dedicated logic. For example, the processor block PROC 410 shown in FIG. 4 spans several columns of CLBs and BRAMs.

Note that FIG. 4 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 4 are purely exemplary. For example, in an actual FPGA more than one adjacent column of CLBs is typically included wherever the CLBs appear, in order to facilitate the efficient implementation of user logic.

In one embodiment, the BRAMs 403 are dual-port memories included in the array of programmable logic and interconnect resources of the field programmable integrated circuit, and one or more of the dual-port memories are configure to provide the respective partial products for a corresponding pair of the splices of a signed value. Each BRAM 403 is configurable to implement either a single 18432-bit dual-port memory or two independent 9216-bit dual-port memories.

For a signed value having up to seventeen bits and a constant having up to nine bits, a multiplication circuit can be implemented using one 9216-bit dual-port BRAM 403 having two ports, each having nine address bits and up to eighteen utilized data bits. The most significant splice includes up to nine bits applied to the address bus of one port and the least significant splice includes up to eight bits padded and applied to the address bus of the other port. This saves one 9216-bit dual-port BRAM 403.

For a signed value having up to seventeen bits and a constant having ten to twenty-six bits, a multiplication circuit can be implemented using one 18432-bit dual-port BRAM 403 having two ports, each having nine address bits and up to thirty-five utilized data bits. The most significant nine or fewer bits of the signed value are applied to the address bus of one port and the least significant eight or fewer bits of the signed value are padded and applied to the address bus of the other port. This saves one 18432-bit dual-port BRAM 403.

For a signed value having twenty-eight to thirty-five bits and a constant having ten to twenty-six bits, a multiplication circuit can be implemented using two 18432-bit dual-port BRAMs 403 with each port having nine address bits and up to thirty-five utilized data bits. One dual-port BRAM 403 has the most significant splice of up to nine bits applied to the address bus of one port and another splice of up to eight bits padded and applied to the address bus of the other port. The remaining two splices each have up to nine bits and are applied to the address bus of respective ports of the other dual-port BRAM 403. This saves one 18432-bit dual-port BRAM 403.

The embodiments are thought to be applicable to a variety of systems for multiplying a signed value by a constant. Other aspects and embodiments will be apparent to those skilled in the art from consideration of the specification. The embodiments may be implemented as one or more processors configured to execute software, as an application specific integrated circuit (ASIC), or as a logic on a programmable logic device. It is intended that the specification and illustrated embodiments be considered as examples only, with a true scope of the invention being indicated by the following claims.

What is claimed is:

1. A multiplier circuit for multiplying a signed value by a constant, comprising:
   an input port configured to receive the signed value separable into at least two splices, wherein a first splice is a most significant one of the at least two splices, and a second splice is another one of the at least two splices;
   at least one memory coupled to the input port, the at least one memory configured with respective products of the constant and possible values of the at least two splices and configured to provide ones of the products addressed by the at least two splices as respective partial products of the signed value and the constant, wherein:
      the at least one memory includes a shared memory configured to provide the respective partial products in response to the first and second splices from a plurality of storage locations in the shared memory; and the plurality of storage locations readable to provide the respective partial product in response to the second splice are a subset of the plurality of storage locations readable to provide the respective partial product in response to the first splice; and an addition circuit coupled to the at least one memory, the addition circuit configured to sum the respective partial products for the at least two splices.

2. The multiplier circuit of claim 1, wherein:
the input port is configured to receive a plurality of bits representing the signed value in a two's complement representation;
the two's complement representation has a sign bit as a most significant bit of the plurality of bits; and
the first splice includes the sign bit.

3. The multiplier circuit of claim 1, wherein the plurality storage locations in the shared memory are configured to store a plurality of partial products for a plurality of potential signed values of the first splice, and the partial product for each potential signed value is a signed product from multiplying the potential signed value and the constant.

4. The multiplier circuit of claim 1, wherein the at least one memory is at least one dual-port memory included in an array of programmable logic and interconnect resources of a field programmable integrated circuit, each dual-port memory configured to provide the respective partial products for a pair of the at least two splices.

5. The multiplier circuit of claim 1, wherein:
the shared memory is a dual-port memory having a first and second port;
the first splice from the input port is coupled to a first address bus of the first port;
the respective partial product for the first splice is read from one of the plurality storage locations referenced by the first splice on the first address bus;
a first data bus of the first port couples the respective partial product for the first splice to the addition circuit;
a concatenation of at least one padding bit and the second splice from the input port is coupled to a second address bus of the second port;
the respective partial product for the second splice is read from one of the plurality storage locations referenced by the concatenation on the second address bus; and
a portion of a second data bus of the second port couples the respective partial product for the second splice to the addition circuit.

6. The multiplier circuit of claim 5, further comprising an interconnect arrangement coupling the input port to the at least one memory, wherein:
the interconnect arrangement separates a plurality of bits representing the signed value into the at least two splices that are the first and second splices;
the interconnect arrangement separates the plurality of bits of the signed value into most significant bits and least significant bits of the plurality of bits, the most signification bits numbering more than the least signification bits;
the interconnect arrangement assigns the most significant bits of the plurality of bits to the first splice; and
the interconnect arrangement assigns the least significant bits of the plurality of bits to the second splice.

7. The multiplier circuit of claim 1, wherein:
the shared memory is a multiport memory configured to concurrently read the respective partial products for the first and second splices from corresponding storage locations of the plurality storage locations;
the multiport memory is configured to read the respective partial product for the first splice from the corresponding storage location referenced by the first splice coupled to a first address bus of a first port of the multiport memory; and
the multiport memory is configured to read the respective partial product for the second splice from the corresponding storage location referenced by a concatenation coupled to a second address bus of a second port of the multiport memory, the concatenation appending the second splice after at least one zero-valued padding bit.

8. The multiplier circuit of claim 7, further comprising an interconnect arrangement coupling the input port to the at least one memory, wherein:
the interconnect arrangement separates a plurality of bits representing the signed value into a respective contiguous group for each splice;
the interconnect arrangement assigns, to each splice, the plurality of bits in the respective contiguous group for the splice;
the interconnect arrangement assigns most significant bits of the plurality of bits to the first splice; and
the interconnect arrangement assigns more of the plurality of bits to the first splice than the interconnect arrangement assigns to the second splice.

9. The multiplier circuit of claim 8, wherein:
the input port is configured to receive the plurality of bits representing the signed value in a two's complement representation, and the two's complement representation has a sign bit as a most significant bit of the plurality of bits;
the interconnect arrangement assigns the sign bit to the first splice, and the interconnect arrangement assigns one more bit to the first splice than the interconnect arrangement assigns to the second splice;
the concatenation appends the second splice after the at least one zero-valued padding bit that is a single zero-valued padding bit, the single zero-valued padding bit of the concatenation corresponding to the sign bit of the first splice;
the plurality storage locations readable to provide the respective partial product for the second splice are the subset of the plurality of storage locations readable to provide the respective partial product for the first splice, and the subset is a lower half of the plurality of storage locations readable to provide the respective partial product for the first splice; and
a first data bus of the first port of the multiport memory couples the respective partial product for the first splice to the addition circuit, and a portion of a second data bus of the second port couples the respective partial product for the second splice to the addition circuit, the portion including all of the second data bus other than a most significant signal of the second data bus.

10. The multiplier circuit of claim 1, further comprising an interconnect arrangement coupling the input port to the at least one memory, wherein:
the interconnect arrangement separates a plurality of bits representing the signed value into a respective contiguous group for each splice;
the interconnect arrangement assigns, to each splice, the plurality of bits in the respective contiguous group for the splice;
the interconnect arrangement assigns most significant bits the plurality of bits to the first splice; and the interconnect arrangement assigns more of the plurality of bits to the first splice than the interconnect arrangement assigns to the second splice.

11. The multiplier circuit of claim 1, wherein:
the shared memory is a time-multiplexed memory configured to serially read the respective partial products for the first and second splices from corresponding storage locations of the plurality storage locations;
the time-multiplexed memory is configured to read the respective partial product for the first splice from the corresponding storage location referenced by the first splice, and the first splice is coupled to an address bus of a port of the time-multiplexed memory during a clock cycle; and
the time-multiplexed memory is configured to read the respective partial product for the second splice from the corresponding storage location referenced by the second splice, and the second splice is coupled to the address bus of the port of the time-multiplexed memory during a different clock cycle.

12. The multiplier circuit of claim 1, wherein the addition circuit is a summing tree circuit.

13. A method for multiplying a signed value by a constant, comprising:
separating the signed value into at least two splices that include a first and a second splice, wherein the first splice is a most significant one of the at least two splices;
reading respective partial products of the signed value and the constant from at least one memory addressed by the at least two splices, including reading the respective partial products addressed by the first and second splices from a shared memory containing a plurality of storage locations, wherein the plurality storage locations readable by the second splice are a subset of the plurality of storage locations readable by the first splice; and
summing the respective partial products for the at least two splices.

14. The method of claim 13, wherein the separating of the signed value includes:
separating a plurality of bits representing the signed value into the at least two splices that are the first and second splices;
separating the plurality of bits of the signed value into most significant bits and least significant bits of the plurality of bits, the most signification bits numbering more than the least signification bits;
assigning the most significant bits of the plurality of bits to the first splice; and
assigning the least significant bits of the plurality of bits to the second splice.

15. The method of claim 14, wherein the reading of the respective partial products for the first and second splices includes:
applying the first splice to a first address bus of a first port of the shared memory that is a multiport memory;
reading the respective partial product for the first splice from one of the plurality storage locations referenced by the first splice on the first address bus;
providing the respective partial product for the first splice to a first data bus of the first port of the multiport memory;
applying a concatenation of at least one padding bit and the second splice to a second address bus of a second port of the multiport memory;
reading the respective partial product for the second splice from one of the plurality storage locations referenced by the concatenation on the second address bus; and
providing the respective partial product for the second splice from a portion of a second data bus of the second port of the multiport memory.

16. The method of claim 13, wherein the separating of the signed value includes:
separating a plurality of bits representing the signed value into a respective contiguous group for each splice, the respective contiguous group for the first splice including most significant bits of the plurality of bits, and the plurality of bits in the respective contiguous group for the first splice numbering more than the plurality of bits in the respective contiguous group for the second splice; and
assigning, to each splice, the plurality of bits in the respective contiguous group for the splice.

17. The method of claim 16, wherein the reading of the respective partial products for the first and second splices includes:
concurrently reading the respective partial products for the first and second splices from the shared memory that is a multiport memory;
reading the respective partial product for the first splice from one of the plurality storage locations referenced by the first splice upon applying the first splice to a first address bus of a first port of the multiport memory; and
reading the respective partial product for the second splice from one of the plurality storage locations referenced by a concatenation upon applying the concatenation to a second address bus of a second port of the multiport memory, the concatenation appending the second splice after at least one zero-valued padding bit.

18. The method of claim 17, wherein:
the plurality of bits represent the signed value in a two's complement representation having a sign bit as a most significant bit of the plurality of bits;
the plurality of bits assigned to the first splice include the sign bit, and the plurality of bits assigned to the first splice number one more bit than the plurality of bits assigned to the second splice;
the concatenation appends the second splice after the at least one zero-valued padding bit that is a single zero-valued padding bit, the single zero-valued padding bit of the concatenation corresponding to the sign bit of the first splice; and
the plurality storage locations that are readable by the concatenation are the subset of the plurality of storage locations that are readable by the first splice, and the subset is a lower half of the plurality of storage locations that are readable by the first splice.

19. The method of claim 13, wherein the reading of the respective partial products for the first and second splices includes:
concurrently reading the respective partial products for the first and second splices from the shared memory that is a multiport memory;
reading the respective partial product for the first splice from one of the plurality storage locations referenced by the first splice upon applying the first splice to a first address bus of a first port of the multiport memory; and
reading the respective partial product for the second splice from one of the plurality storage locations referenced by a concatenation upon applying the concatenation to a second address bus of a second port of the multiport memory, the concatenation appending the second splice after at least one zero-valued padding bit.

20. The method of claim 13, further comprising initializing the plurality storage locations in the shared memory with a plurality of partial products for a plurality of potential signed values of the first splice, wherein the partial product for each potential signed value is a signed product from multiplying the potential signed value and the constant.

* * * * *